(12) United States Patent
Kilburn

(10) Patent No.: US 7,492,564 B2
(45) Date of Patent: Feb. 17, 2009

(54) PROTECTION APPARATUS FOR AN ELECTRICAL LOAD

(75) Inventor: Jeffrey Alan Kilburn, Hartland, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 116 days.

(21) Appl. No.: 11/241,095

(22) Filed: Sep. 30, 2005

(65) Prior Publication Data

US 2007/0076335 A1    Apr. 5, 2007

(51) Int. Cl.
*H01H 73/00* (2006.01)
(52) U.S. Cl. ...................................... 361/115
(58) Field of Classification Search ................... 361/115
See application file for complete search history.

(56) References Cited

U.S. PATENT DOCUMENTS

| 5,872,722 | A | * | 2/1999 | Oravetz et al. ............. 700/292 |
| 5,901,025 | A | * | 5/1999 | Takahashi et al. .......... 361/93.4 |
| 6,512,380 | B2 | * | 1/2003 | Turvey ...................... 324/647 |

FOREIGN PATENT DOCUMENTS

JP    03103022 A  *  4/1991

OTHER PUBLICATIONS

English Translation of Ishii et al. (JP 3-103022) (Oct. 2007).*
Moeller Electric Corporation; Main Catalog USA 2000/2001; Automation/Motor Control Energy Distribution; pp. 7/24-7/25.
Industrial Control Products Main Catalog; Manual Motor Protectors, Magnetic Motor Protector Combinations and Type E Self-protected Combination Starters: Overview—System PKZ 2; pp. 08/025-08/048 and 08/064-08/071; http://www.moellerusa.net/content/catalog_main_USA.shtml.

* cited by examiner

*Primary Examiner*—Michael J Sherry
*Assistant Examiner*—Scott Bauer
(74) *Attorney, Agent, or Firm*—Fletcher Yoder; Alexander R. Kuszewski

(57) ABSTRACT

The trip unit of a circuit breaker provides overload protection for a contactor used to energize a load such as a motor while still providing conventional protection for the wiring serving the motor. The trip unit of the circuit breaker eliminates the need for a separate overload relay by generating a pre-trip signal that opens the contactor when the circuit breaker $I^2t$ long delay function reaches a selected percentage, such as about 85%, of the trip value.

20 Claims, 3 Drawing Sheets

PROTECTION APPARATUS FOR AN ELECTRICAL LOAD

BACKGROUND OF THE INVENTION

1. Field of the Invention

This invention relates to apparatus for protecting an electrical load such as a motor and the wiring supplying power to the motor from overload currents. More particularly, it relates to the combination of a contactor for switching the motor off and on with a circuit breaker that not only has a trip function for protecting the wiring, but also opens the contactor as an overload trip is approached to thereby provide motor protection previously provided by a separate overload relay.

2. Background Information

It is common to control power to electrical loads such as motors with a contactor. In its simplest form, the contactor can be just an "off/on" switch such as a manually operated mechanical switch. More commonly, the contactor is an electrically operated switch in which a solenoid is continuously energized to hold the contacts closed. The contactor is opened by spring force when the coil is de-energized. In many applications, overcurrent protection is provided for the load. This is particularly true for loads such as motors that draw current well above rated current (maximum continuous current) during starting. An overload relay models the heat generated by this overload current as an $I^2t$ function. As long as the current stays within the bounds of this function, with an appropriate margin, the contactor remains closed. Should the current limits be exceeded because of a stalled rotor or other reason, the overload relay trips the contactor open by de-energizing the solenoid. Thus, the overload relay protects the load.

The electrical system providing power to the load also includes a circuit breaker upstream of, and often at a considerable distance from, the contactor. The circuit breaker protects the wiring, typically from short circuits and from excessive current drawn by the load. Short circuit protection is provided by an instantaneous and/or short delay trip function that opens the circuit breaker without appreciable delay if the current exceeds a selected very high amplitude. A long delay trip function may be included to respond to persistent overload conditions typically through use of an $I^2t$ function to protect the wiring.

Currently three devices are used to control and protect loads such as motors: a contactor, an overload relay, and a circuit breaker. The contactor is the primary device for energizing and de-energizing the load, and as such, is designed for many thousands of operations. The circuit breaker provides protection, and will experience fewer operations. The circuit breaker is often located remotely from the load.

SUMMARY OF THE INVENTION

In accordance with the invention, protection apparatus for an electrical load comprises a circuit breaker having a trip unit that trips the circuit breaker open when a selected time related function of current through the circuit breaker reaches a selected trip value and that generates a pre-trip output when the selected time related function of current reaches a selected pre-trip value that is below the selected trip value. The apparatus further includes a contactor electrically connected between the circuit breaker and the load comprising separable contactor contacts having a closed state in which current flows through the contactor and an open state in which current flow through the contactor is interrupted, and means responsive to the pre-trip output operating the contactor to the open state. The selected time related function can be an $I^2t$ function and the selected pre-trip value can be a percentage of the selected trip value of the $I^2t$. This percentage can be above about 80%, for instance about 80-90%, and in the exemplary apparatus is about 85%.

The invention eliminates the need for the overload relay while still providing motor protection, which is initiated in the circuit breaker. However, the contactor which is designed for more operations and is more accessible for reclosing is opened rather than the circuit breaker. The circuit breaker will still open when the trip value is reached should the contactor not respond or a fault occur in the wiring. This arrangement is particularly useful where the circuit breaker is located remotely as it need not be accessed.

BRIEF DESCRIPTION OF THE DRAWINGS

A full understanding of the invention can be gained from the following description of the preferred embodiments when read in conjunction with the accompanying drawing in which.

DESCRIPTION OF THE PREFERRED EMBODIMENTS

Figure 1:
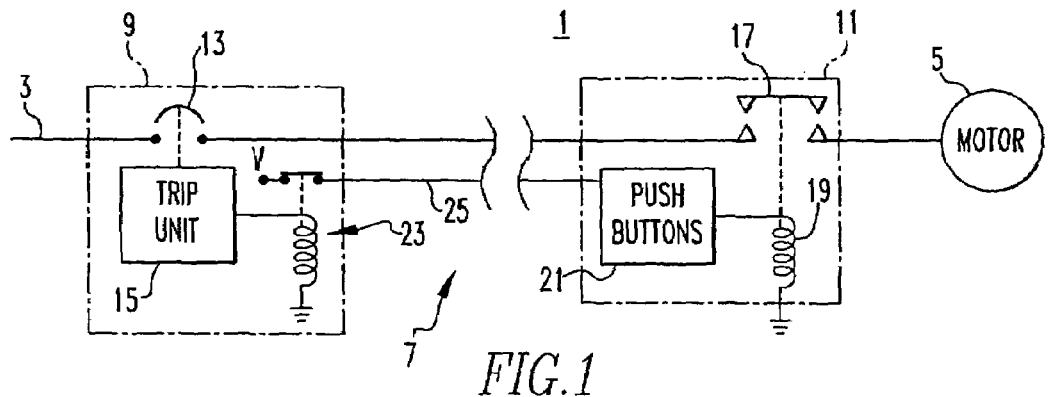
FIG. 1 is a schematic diagram of an electric power system incorporating the protection apparatus of the invention.

As shown in FIG. 1, an electric power system 1 includes a power line 3 supplying electrical power to a load such as a motor 5. Typically, the power line 3 and motor would be three-phase, but are shown in single line form for clarity. Protection apparatus 7 in accordance with the invention includes a circuit breaker 9 inserted in the power line 3 and a contactor 11, also inserted in the power line 3 between the circuit breaker 9 and the motor 5. Alternatively, the circuit breaker 9 can be located between the contactor 11 and the motor 5. The circuit breaker 9 includes separable circuit breaker contacts 13 (for each phase of the power line 3) that can be automatically tripped open by a trip unit 15. As is well known, the separable contacts 13 can also be opened and closed by a handle (not shown). The contactor 11 includes separable contactor contacts 17 that are operated between an open state and closed state by a solenoid 19. The solenoid 19 in turn is controlled by push buttons 21. When the solenoid 19 is energized by an "on" push button (not shown), the separable contacts 17 are operated to the closed state. De-energization of the solenoid 19 such as by an "off" push button (not shown) results in the separable contacts 17 being operated to the open state.

In accordance with the invention, the solenoid 19 can also be de-energized by a relay 23 which forms an output of the trip unit 15 of the circuit breaker 9. Energization of the output relay 23 connected to the contactor 11 through line 25 interrupts the flow of current through solenoid 19 to open the contactor.

Figure 2:
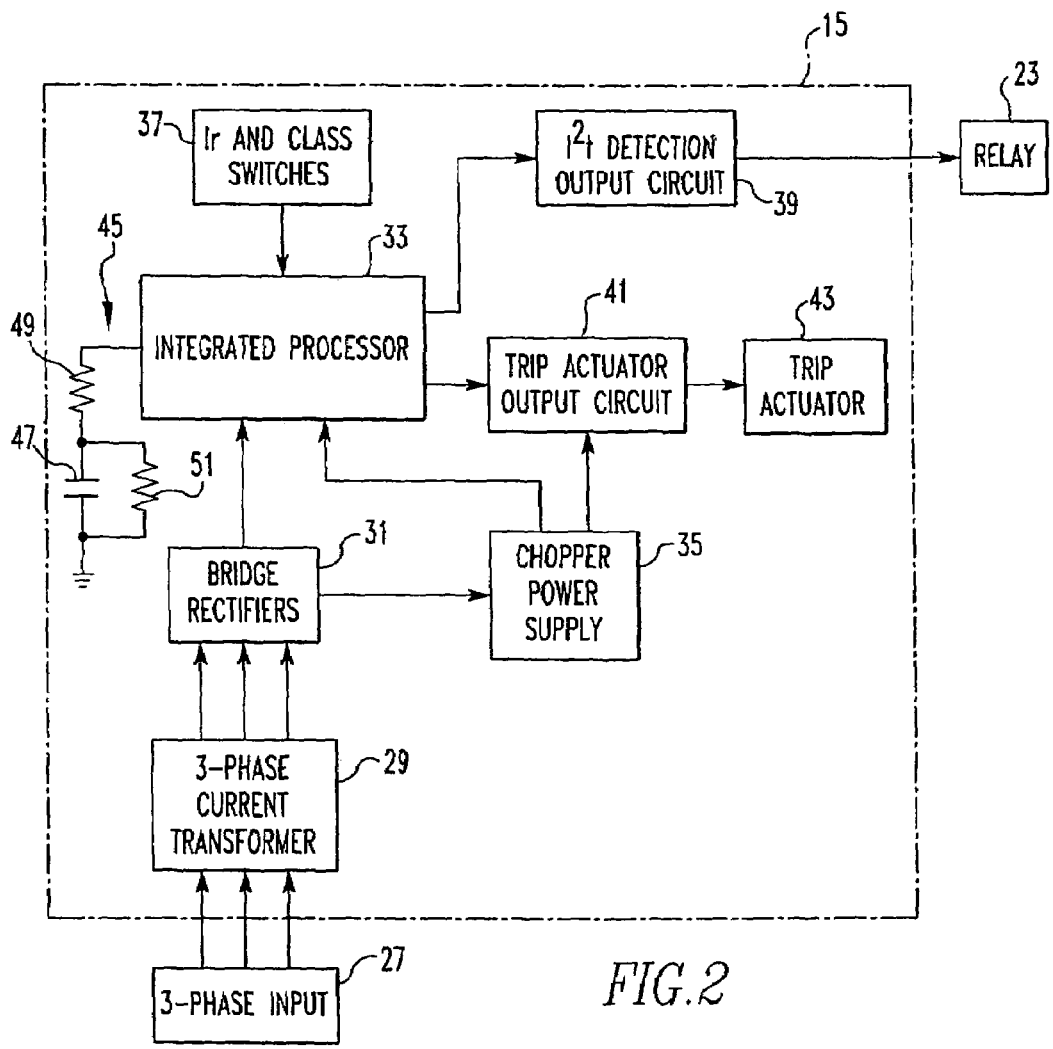
FIG. 2 is a block diagram of a trip unit of a circuit breaker that forms part of the protection apparatus of FIG. 1.

The trip unit 15 of the circuit breaker 9 is shown schematically in FIG. 2. Current from the electrical power system is provided to the trip unit 15 through a three-phase input 27 from the power line 3 to three-phase current transformer 29. The three-phase currents are rectified by bridge rectifiers 31 for input to an integrated digital processor 33. The rectified current also energizes a chopper power supply 35 that supplies regulated dc power for operation of the trip unit. Switches 37 provide input of the rated current set point, Ir, and class of the motor 5.

The digital processor 33 of the circuit breaker trip unit 15 contains algorithms, to be described, which provide known protection functions such as short delay and long delay that protect the wiring in the power line 3 downstream of the circuit breaker 9. The long delay protection function can be the $I^2t$ function which mimics heating of the wiring. This function also closely mimics heating of the motor 5 due to overload current drawn by the motor. As previously discussed, it is a common practice to provide an overload relay to implement the $I^2t$ protection for the motor. The trip point for the overload relay is selected such that the contactor is opened by the overload relay in response to heating of the motor before the circuit breaker trips.

In accordance with the invention, the need for the overload relay is eliminated because the contactor is opened in response to overheating of the motor before the circuit breaker trips. This is accomplished by generating an output from the trip unit 15 as it approaches, but before it reaches, the long delay trip value. An $I^2t$ detection output circuit 39 operates the relay 23, which as described, de-energizes the solenoid 19 in the contactor to open the separable contactor contacts 17 when the $I^2t$ function reaches a pre-trip value, which is set below the trip value. This pre-trip value can be, for instance, a percentage of the trip value. Depending upon the particular installation, this pre-trip value could be set above, for example about 80%, or over a range of values such as between about 80% and 90%. In the exemplary system, the pre-trip value is about 85% of the trip value. If the contactor 11 does not open, the digital processor continues the long delay protection and will generate a trip signal that is used by a trip actuator output circuit 41 to energize a trip actuator 43 that opens the separable contacts 13 of the circuit breaker 9.

Because the trip unit 15 is powered by the current in the line 3 through the three-phase current transformers 29, when the current is interrupted either by opening of the contactor 11 or the circuit breaker 9, power to the trip unit is lost, and with it the characterization of motor heating. Under these conditions, when the contactor and circuit breaker are again closed to restart the motor, the motor could still be overheated, but the digital processor would have no memory of that heating and would reinitialize. In order to avoid the loss of the state of motor heating, the trip unit 15 includes a memory circuit 45. The value of the $I^2t$ function generated by the digital processor is applied to a capacitor 47 of the memory circuit 45 through resistor 49. A shunt resistor 51 bleeds charge from the capacitor 45 at a rate which mimics cooling of the motor. When the trip unit is again energized, the voltage on the capacitor 47 is read and used as the initial value for the $I^2t$ calculation, as is known.

In some applications, it is a known practice to provide a "hot start" feature. This is accomplished hereby by maintaining the charge on capacitor 47 at 75% or 50% of the trip value while the motor current is below the $I_r$ threshold.

Figure 3:
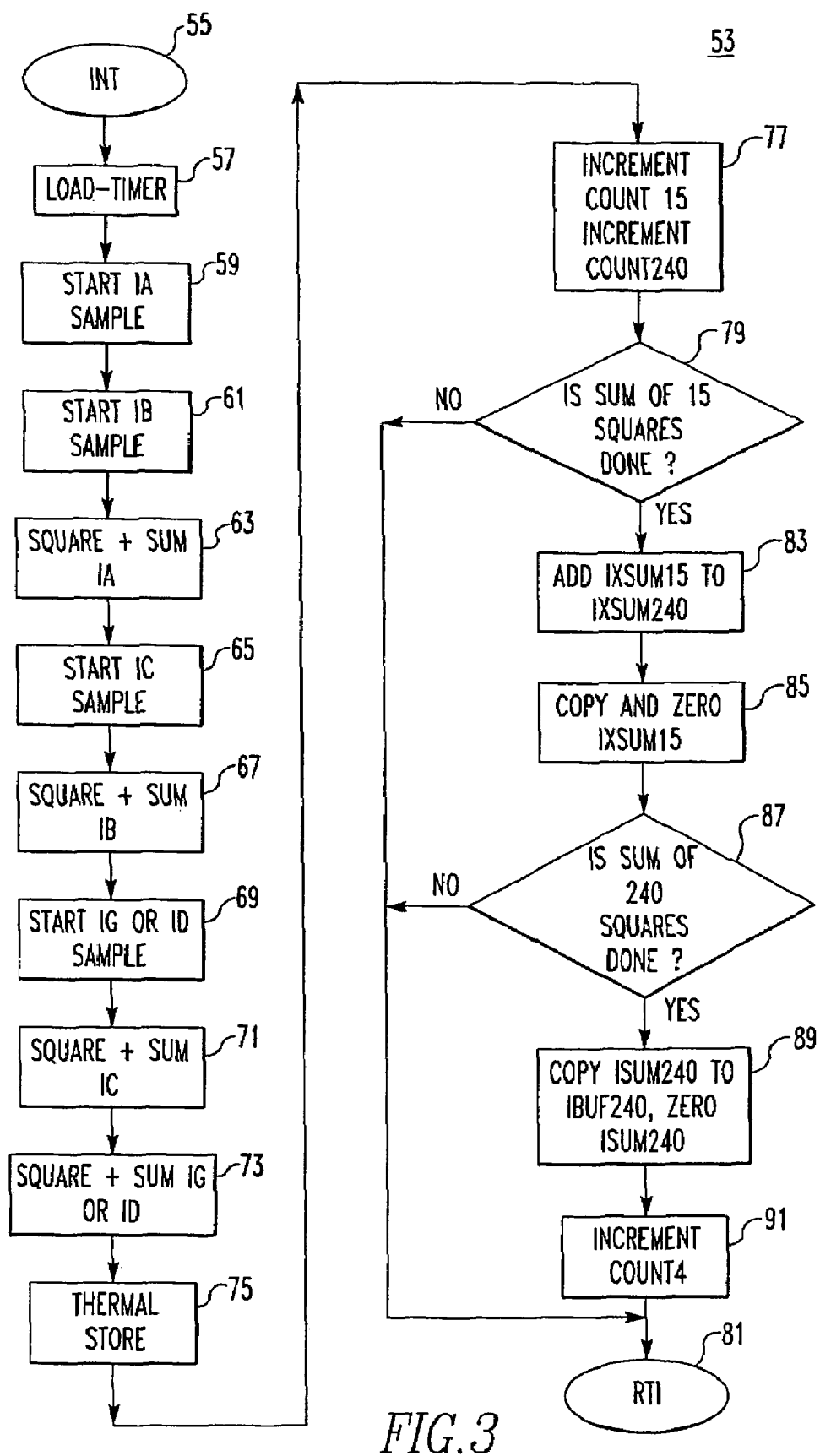
FIG. 3 is a flow chart of an interrupt routine implemented by the trip unit of FIG. 2.

FIG. 3 illustrates the interrupt routine which is run periodically by the integrated processor 33. This routine runs repeatedly at a rate set for sampling of the three phase currents. In the exemplary embodiment of the invention, this is 15 times per cycle of current in the line 3. Upon calling of the routine at 55, a timer that performs the timing functions of the routine is loaded at 57. A sample of the current in phase A is taken at 59 and is followed by sampling the B phase current at 61. The A phase current just sampled is squared and added to a sum of phase A current samples squared at 63. Then C phase current is sampled at 65 followed by the squaring and summing of the B phase current at 67. If there is a fourth phase D (such as neutral or ground current) being monitored, that current is sampled at 69. Next, the C current is squared and summed at 71 and is followed by squaring and summing of the D phase or ground current at 73. The highest of the summed squared phase currents is applied to the thermal store circuit 45 at 75. A counter for recording 15 samples, and another counter for recording 240 samples are both incremented at 77. If the number of squared current samples accumulated at this point has not reached 15 as determined at 79, the interrupt routine is exited at 81.

When 15 samples have been gathered by the interrupt routine, the 15 count sum of the squares for each phase (represented by X) is added to the corresponding phase sum for the 240 sample accumulation at 83. The sum of the squares from 15 samples for each phase is then copied at 85 before being zeroed in preparation for the next 15 sample accumulation. When this has been repeated 16 times and 240 samples have been accumulated as determined at 87, the accumulated sum of the squares for 240 samples for each phase is copied at 89 and then zeroed. Finally, a count 4 register is incremented at 91. This count, as will be seen, is used by the main routine for performing certain tasks after 960 samples (4×240) have been taken.

Figure 4:
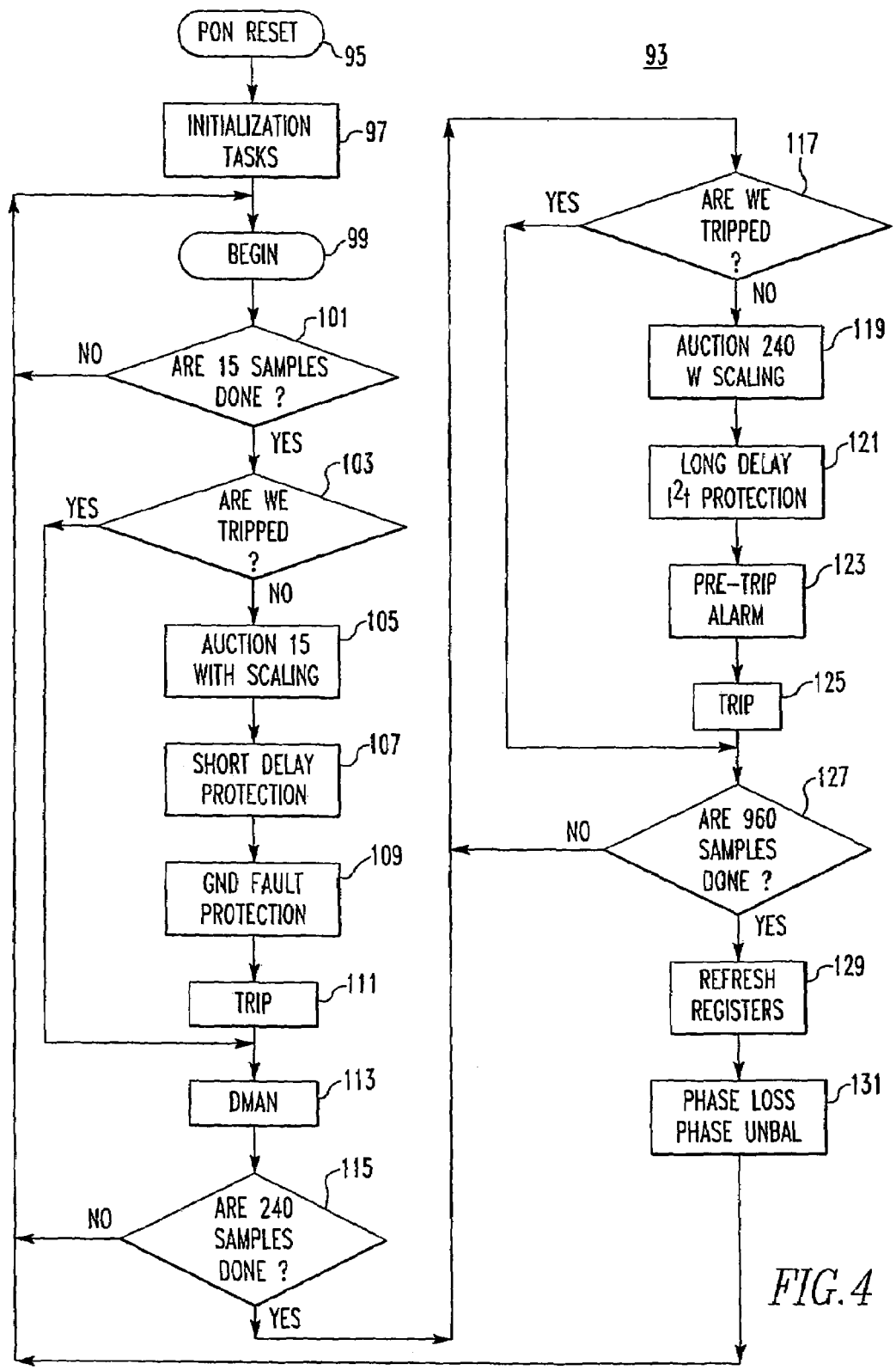
FIG. 4 is a flow chart of the main routine of the trip unit of FIG. 2.

A main routine 93 shown in FIG. 4, is run continuously. When the trip unit is initially energized, a power on reset is initiated at 95 and initialization tasks are run at 97, as is common practice. The main routine 93 then enters a continuous loop at 99. When 15 samples have been accumulated as determined at 101, and a trip has not been generated as determined at 103, an auction function determines at 105 which phase has the highest sum of the squares for the most recent 15 sample accumulation.

This highest accumulated sum is scaled (also known as calibration). The calibration value is then used for short delay protection at 107. Ground fault protection is optionally applied at 109, and if either of these protection functions has reached a trip value, a trip signal is generated at 111: A deadman function, as is common, is serviced at 113. The main routine then cycles back to the beginning at 115 until a 240 sample accumulation has been generated. If a trip has not been previously generated as determined at 117 an auction at 119 determines the phase with the highest sum of squares for the most recent 240 sample accumulation at 119. That value is used in the $I^2t$ calculation for long delay protection at 121. When the pre-trip value of $I^2t$ for long delay protection has been reached, a pre-trip alarm is generated at 123, which as discussed above, opens the contactor 11. When the $I^2t$ long delay trip value is reached, the trip signal is generated at 125. When 960 samples have been accumulated as determined at 127, registers are refreshed at 129, and phase loss and phase unbalance protection is implemented at 131.

As can be seen from the above, the invention utilizes the trip unit of the circuit breaker 9 to open the contactor 11 to provide pre-trip overload protection for the motor, which eliminates the need for a separate overload relay. This reduces the number of components needed to provide protection for the motor and the wiring thereby reducing costs and saving space, which can be important considerations, especially in installations involving multiple contactors mounted in a common panel board.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. Protection apparatus for an electrical load comprising:
   a circuit breaker comprising a trip unit that trips the circuit breaker open when a selected time related function of current through the circuit breaker reaches a selected trip value and that generates a pre-trip output when the selected time related function of current reaches a selected pre-trip value below the selected trip value; and
   a contactor electrically connected to the circuit breaker and the load comprising separable contactor contacts having a closed state in which current flows through the contactor and an open state in which current flow through the contactor is interrupted, and means responsive to the pre-trip output operating the separable contactor contacts to the open state.

2. The apparatus of claim 1, wherein the selected time related function is an $I^2t$ function where I is the current and t is time.

3. The apparatus of claim 2, wherein the selected pre-trip value is a percentage of the selected trip value of the $I^2t$ function below 100%.

4. The apparatus of claim 3, wherein the selected pre-trip value is above about 80% of the selected trip value.

5. The apparatus of claim 4, wherein the selected pre-trip value is about 85% of the selected trip value of the $I^2t$ function.

6. The apparatus of claim 1, wherein the selected pre-trip value is a percentage of the selected trip value of the time related function of current.

7. The apparatus of claim 6, wherein the selected pre-trip value is about 80% to about 90% of the trip value of the time related function of current.

8. The apparatus of claim 1, wherein the circuit breaker is located remotely from the contactor.

9. Protection apparatus for an electrical load comprising:
   a circuit breaker comprising a trip unit that trips the circuit breaker open when a selected time related function of current through the circuit breaker reaches a selected trip value and that generates a pre-trip output when the selected time related function of current reaches a selected pre-trip value below the selected trip value; and
   a contactor electrically connected to the circuit breaker and the load comprising separable contactor contacts having a closed state in which current flows through the contactor and an open state in which current flow through the contactor is interrupted, and means responsive to the pre-trip output operating the separable contactor contacts to the open state;
   wherein the selected time related function is an $I^2t$ function where I is the current and t is time.

10. The apparatus of claim 9, wherein the selected pre-trip value is a percentage of the selected trip value of the $I^2t$ function below 100%.

11. The apparatus of claim 10, wherein the selected pre-trip value is above about 80% of the selected trip value.

12. The apparatus of claim 11, wherein the selected pre-trip value is about 85% of the selected trip value of the $I^2t$ function.

13. The apparatus of claim 9, wherein the circuit breaker is located remotely from the contactor.

14. Protection apparatus for an electrical load comprising:
    a circuit breaker comprising a trip unit that trips the circuit breaker open at a first $I^2t$ function value of current through the circuit breaker and that generates a pre-trip output at a lower $I^2t$ function value of current; and
    a contactor electrically connected to the circuit breaker and the load comprising separable contactor contacts having a closed state in which current flows through the contactor and an open state in which current flow through the contactor is interrupted, and means responsive to the pre-trip output operating the separable contactor contacts to the open state.

15. The apparatus of claim 14, wherein the selected pre-trip value is a percentage of a selected trip value of the $I^2t$ function below 100%.

16. The apparatus of claim 15, wherein the selected pre-trip value is above about 80% of the selected trip value.

17. The apparatus of claim 16, wherein the selected pre-trip value is about 85% of the selected trip value of the $I^2t$ function.

18. The apparatus of claim 14, wherein the circuit breaker is located remotely from the contactor.

19. The apparatus of claim 1, wherein the contactor is electrically connected in series between the circuit breaker and the load.

20. The apparatus of claim 9, wherein the contactor is electrically connected in series between the circuit breaker and the load.

* * * * *